United States Patent
Choi et al.

(10) Patent No.: US 9,046,381 B2
(45) Date of Patent: Jun. 2, 2015

(54) SYSTEM AND METHOD FOR PARTIALLY UPDATING MAP DATA BASED ON USER'S MOVEMENT PATH, SERVICE APPARATUS AND TERMINAL APPARATUS THEREOF, AND RECORDING MEDIUM THEREFOR

(75) Inventors: Yun Seok Choi, Seoul (KR); Eun Bok Lee, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 0 days.

(21) Appl. No.: 14/127,748

(22) PCT Filed: Apr. 12, 2012

(86) PCT No.: PCT/KR2012/002768
§ 371 (c)(1),
(2), (4) Date: Dec. 19, 2013

(87) PCT Pub. No.: WO2012/176973
PCT Pub. Date: Dec. 27, 2012

(65) Prior Publication Data
US 2014/0136099 A1   May 15, 2014

(30) Foreign Application Priority Data
Jun. 22, 2011  (KR) .......................... 10-2011-0060465

(51) Int. Cl.
*G01C 21/26*   (2006.01)
*G01C 21/34*   (2006.01)
(Continued)

(52) U.S. Cl.
CPC ............ *G01C 21/3667* (2013.01); *G01C 21/32* (2013.01); *G06F 17/30241* (2013.01); *G09B 29/10* (2013.01); *G08G 1/0969* (2013.01);
(Continued)

(58) Field of Classification Search
USPC .................... 701/400, 408, 412, 468, 23–26; 340/988, 991–993
See application file for complete search history.

(56) References Cited

U.S. PATENT DOCUMENTS

2005/0033511 A1 *  2/2005  Pechatnikov et al. .......... 701/210
2006/0276962 A1 * 12/2006  Yoshioka et al. ............. 701/208
(Continued)

FOREIGN PATENT DOCUMENTS

| JP | 2006065246 A | 3/2006 |
|---|---|---|
| KR | 1020060040009 A | 5/2006 |

(Continued)

OTHER PUBLICATIONS

International Search Report mailed Oct. 23, 2012 for PCT/KR2012/002768.

*Primary Examiner* — Yonel Beaulieu
(74) *Attorney, Agent, or Firm* — Lowe Hauptman & Ham, LLP

(57) ABSTRACT

The present invention relates to a system and a method for partially updating map data based on a user's movement path, a service apparatus and a terminal apparatus thereof, and a recording medium therefor, and the method includes checking a major movement path of a user; receiving map data update information; extracting partial map data to be updated from map data matched with the major movement path of the user to request update information for the extracted partial map data; and receiving the requested update information on the partial map data to update the map data, and according to the present invention, map data matched with a user's major movement path is partially updated by determining the user's major movement path to more efficiently update the map data.

18 Claims, 4 Drawing Sheets

(51) Int. Cl.
*G08G 1/01* (2006.01)
*G01C 21/36* (2006.01)
*G01C 21/32* (2006.01)
*G06F 17/30* (2006.01)
*G09B 29/10* (2006.01)
*G08G 1/0969* (2006.01)

(52) U.S. Cl.
CPC ............ *G09B29/106* (2013.01); *G08G 1/0112* (2013.01); *G08G 1/0129* (2013.01)

(56) References Cited

U.S. PATENT DOCUMENTS

2007/0198184 A1* 8/2007 Yoshioka et al. ............. 701/211
2012/0029817 A1* 2/2012 Khorashadi et al. .......... 701/451

FOREIGN PATENT DOCUMENTS

KR 1020060092565 A 8/2006
KR 1020080017610 A 2/2008

\* cited by examiner

SYSTEM AND METHOD FOR PARTIALLY UPDATING MAP DATA BASED ON USER'S MOVEMENT PATH, SERVICE APPARATUS AND TERMINAL APPARATUS THEREOF, AND RECORDING MEDIUM THEREFOR

TECHNICAL FIELD

The present invention relates to a method for partially updating map data based on a user's movement path and, particularly, to a system and a method for partially updating map data based on a user's movement path that determine a user's movement path and partially update map data based on the determined user's movement path, a service apparatus and a terminal apparatus thereof, and a recording medium therefor.

BACKGROUND ART

A navigation system displays a current location of a moving body by using information received from a global positioning system (hereinafter, referred to as a 'GPS') and a driving state measured by using a plurality of sensors installed in the moving body, and displays the detected current location of the moving body so as to be matched with map data. Further, the navigation system provides a function to search for a driving path from a starting point of the moving body up to a destination by using the map data and guide the driving path of the moving body according to the searched driving path.

A map update technology of the navigation system may be divided into a first update scheme using a PC sync in a map incorporated navigation and a second streaming scheme.

In the update scheme using the PC sync in the map incorporated navigation, a map is incorporated in a terminal and thus map data can be immediately expressed, but when a change occurs in the map as time elapses, although the map data is updated and distributed to a server, if the map in the terminal is not updated through sync with a PC every predetermined period, an old map is continuously used, and as a result, a changed content of the map is not reflected when the navigation service is provided.

In the map streaming type update scheme, up-to-date data can be continuously provided to a user in such a manner that map data of a specific area is requested to the server to be downloaded and thereafter, is expressed on a screen, but the user should wait for a time required to download the data according to the request for the map data and express the downloaded data on the screen or the map may not be seen by a data communication environment or a surrounding environment.

DETAILED DESCRIPTION OF THE INVENTION

Technical Problems

The present invention is proposed to solve the above-mentioned problems. An object of the present invention is to provide a system and a method for partially updating map data based on a user's movement path that determine a user's major movement path and partially update map data based on the determined user's major movement path in real time, a service apparatus and a terminal apparatus thereof, and a recording medium therefor, in a map incorporated navigation.

Technical Solutions

As one solution, the present invention provides a system for partially updating map data based on a user's movement path, including: a service apparatus configured to transmit map data update information, when receiving a request for update information for partial map data, extract the requested update information for the partial map data, and transmit the extracted update information for the partial map data; and a terminal apparatus configured to extract major movement path information of a user to check a major movement path of the user through the extracted major movement path information, receive the map data update information from the service apparatus, extract partial map data to be updated from map data matched with the major movement path of the user, request update information for the extracted partial map data to the service apparatus, receive the update information for the partial map data matched with the major movement path of the user from the service apparatus, and partially update the map data by using the received update information for the partial map data.

As another solution, the present invention provides a service apparatus, including: a transceiving unit configured to transmit and receive data; a storage unit configured to store map data; and a control unit configured to transmit map data update information to a terminal apparatus through the transceiving unit, when receiving a request for update information for partial map data from the terminal apparatus, extract the requested update information on the partial map data, and transmit the extracted update information for the partial map data to the terminal apparatus through the transceiving unit.

In the service apparatus of the present invention, the control unit may be further configured to transmit the map data update information by at least one of a level unit, a tile unit, and a layer unit of the map data.

In the service apparatus of the present invention, the control unit may be further configured to receive major movement path information of a user of the terminal apparatus and version information of the map data of the terminal apparatus from the terminal apparatus, and check the version information of the map data of the terminal apparatus, and when updating is required, transmit update information for map data matched with the major movement path of the user.

In the service apparatus of the present invention, the storage unit may be further configured to store authentication information, and the control unit may be further configured to authenticate the terminal apparatus by using the user authentication information to transmit the map data update information to the terminal apparatus which succeeds in authentication.

In the service apparatus of the present invention when the control unit receives information on a starting point and a destination, the control unit may be further configured to calculate a route from the starting point to the destination and transmit information on the calculated route to the terminal apparatus.

As yet another solution, the present invention provides a terminal apparatus including: a terminal transceiving unit configured to transmit and receive data; a terminal storage unit configured to store map data; a terminal input unit configured to input information; a terminal output unit configured to output information; a global positioning system (GPS) unit configured to calculate a location and a speed of the terminal apparatus from a GPS signal; and a terminal control unit configured to extract major movement path information of a user to check a major movement path of the user through the extracted major movement path information, receive map data update information from a service apparatus through the terminal transceiving unit, extract partial map data to be updated from map data matched with the major movement path of the user, request update information for the extracted partial map data to the service apparatus through the terminal transceiving unit, receive the information for the partial map data matched with the major movement path of the user from the service apparatus through the terminal transceiving unit, and partially update the map data by using the received information for the partial map data.

In the service apparatus of the present invention the terminal control unit may be further configured to request the update information for the partial map data by at least one of a level unit, a tile unit, and a layer unit of the map data.

In the service apparatus of the present invention the terminal control unit may be further configured to extract the partial map data to be updated from the map data by further using at least one information of setting information of the terminal apparatus and movement state information of the terminal apparatus.

In the service apparatus of the present invention the terminal control unit may be further configured to detect a location of the terminal apparatus in real time during a predetermined period to check a major movement path of the user through a change of the location.

In the service apparatus of the present invention the terminal control unit may be further configured to check the major movement path of the user through schedule information received through the terminal input unit.

As still another solution, the present invention provides a method for partially updating map data based on a user's movement path, including: extracting, by a terminal apparatus, major movement path information of a user and checking a major movement path of the user through the extracted major movement path information; receiving, by the terminal apparatus, map data update information from a service apparatus; extracting, by the terminal apparatus, partial map data to be updated from map data matched with the major movement path of the user; requesting update information for the extracted partial map data to the service apparatus; receiving, by the terminal apparatus, update information for the partial map data matched with the major movement path of the user from the service apparatus; and partially updating the map data by using the received update information for the partial map data.

The method may further include, before the receiving of the update information, requesting, by the terminal apparatus, the map data update information to the service apparatus.

As still yet another solution, the present invention provides a computer-readable recording medium recording thereon a program executing: extracting major movement path information of a user and checking a major movement path of the user through the extracted major movement path information; receiving map data update information; extracting partial map data to be updated from map data matched with the major movement path of the user to request update information for the extracted partial map data; receiving the requested update information for the partial map data; and partially updating prestored map data by using the received update information for the partial map data.

Advantageous Effects

According to the present invention, map data matched with a user's major movement path is partially updated by determining the user's major movement path to preferentially update a part required for a user, thereby more efficiently updating the map data.

Further, the map data matched with the user's major movement path is partially updated to reduce a data amount and a time required for updating.

In addition, a more accurate path guiding service is provided by using updated latest map data to improve user convenience.

MODE FOR CARRYING OUT THE INVENTION

Figure 1:
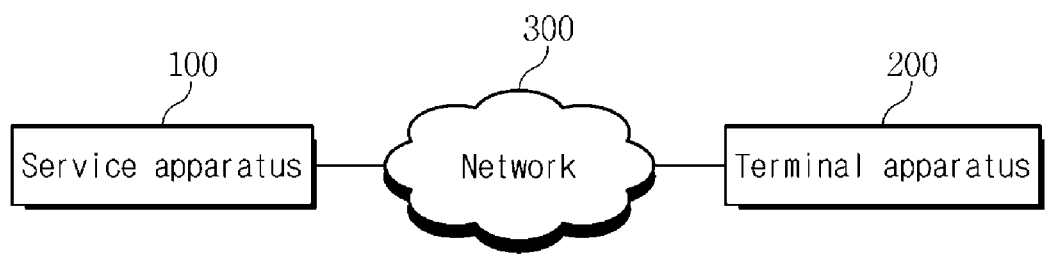
FIG. 1 is a configuration diagram of a system for partially updating map data in accordance with an embodiment of the present invention.

Hereinafter, preferred embodiments of the present invention which can be easily implemented by those skilled in the art will be described in detail with reference to the accompanying drawings. However, in describing an operating principle according to the preferred embodiment, a detailed description of known configurations or functions incorporated herein will be omitted when it is determined that the detailed description may make the subject matter of the present disclosure unclear. Further, parts having the similar function and performing the similar operation are designated by the same reference numerals throughout the specification.

In the specification, when any one component 'transmits' data or a signal to another component, any one component may directly transmit the data or signal or transmit the data or signal through at least one other component.

FIG. 1 is a configuration diagram of a system for partially updating map data in accordance with an embodiment of the present invention. Referring to FIG. 1, the system for partially updating map data in accordance with the present invention is configured to include a service apparatus 100, a terminal apparatus 200, and a network 300.

The service apparatus 100 manages and stores the map data for each version and when the map data is updated, the service apparatus 100 transmits map data update information to the terminal apparatus 200. Further, when the service apparatus 100 receives a request for partial map data from the terminal apparatus 200, the service apparatus 100 extracts the requested partial map data from the map data and transmits update information on the extracted partial map data to the terminal apparatus 200.

Figure 5:
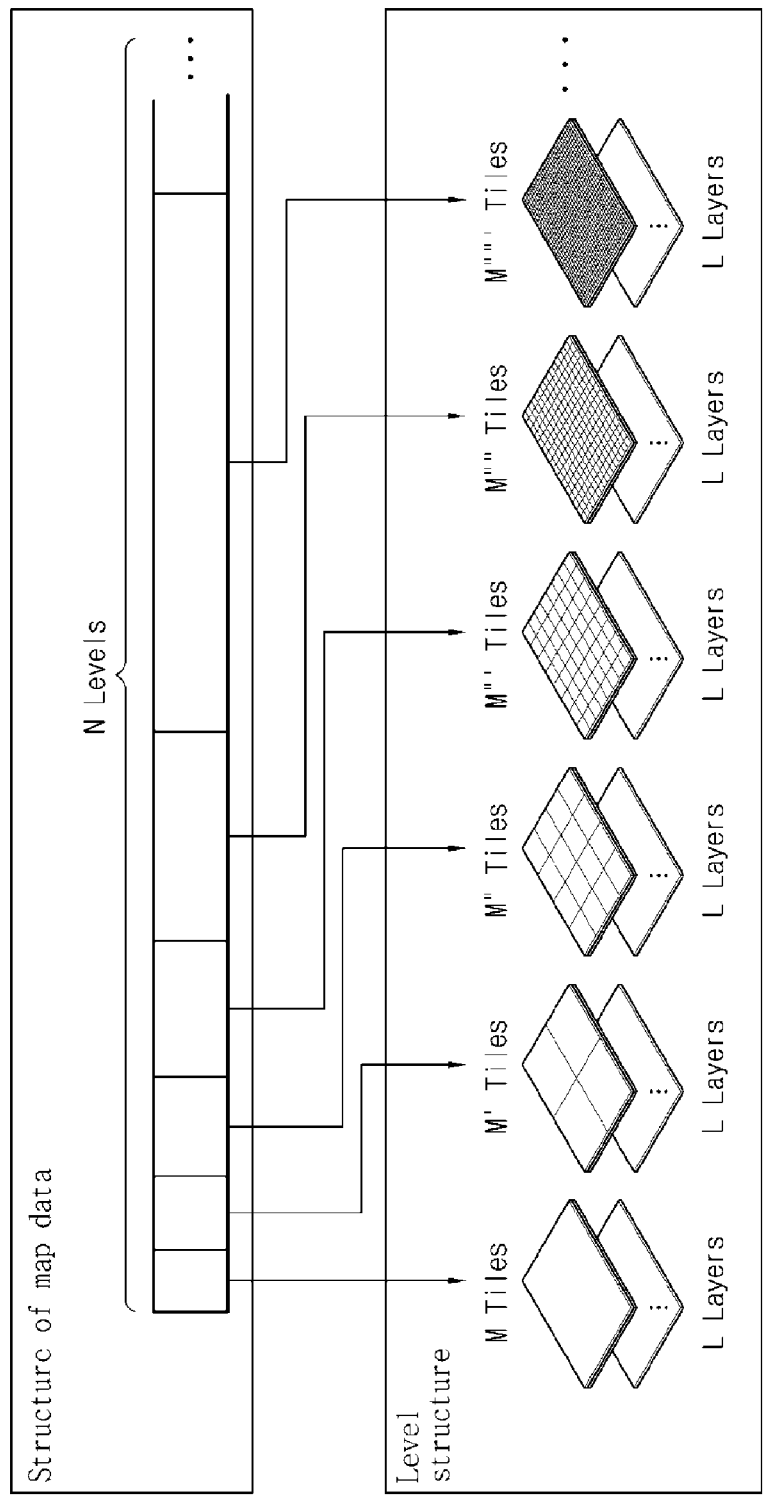
FIG. 5 is a diagram illustrating a structure of the map data in accordance with an embodiment of the present invention.

The map data may be data which are divided by a level, a tile, and a layer as illustrated in FIG. 5, and a description thereof will be described below in detail.

The map data update information as information regarding a part changed for each version of the map data may be expressed by combinations of a level ID, a tile ID, and a layer ID.

The terminal apparatus 200 as an apparatus used by a user who intends to use a map data partially updating service stores the map data, displays the map data in accordance with a user's movement path, and guides a route up to a destination.

In detail, the terminal apparatus 200 receives the map data update information by accessing the service apparatus 100 through the network 300 in order to partially update the incorporated map data. The terminal apparatus 200 checks a user's major movement path of the terminal apparatus 200 in the received map data update information to request the update information on the partial map data which is partial data which needs to be updated in the map data matched with the verified major movement path. Thereafter, the terminal apparatus 200 partially updates and displays the map data by using the information on the received partial map data by receiving the information on the requested partial map data, so that the user may continuously be guided for the path based on the latest map data.

In the map data partially updating system, the service apparatus 100 may operate in a server client computing scheme or based on cloud computing. For example, the service apparatus 100 may be implemented by one or more servers that operates based on the cloud computing.

The network 300 means a data communication network for data transmission and information exchange between the service apparatus 100 and the terminal apparatus 200, and a type thereof is not particularly limited. For example, the network 300 may be an all Internet protocol (IP) network which is an IP network structure in which different networks are integrated based on IPs as an IP network providing a transmission and reception service of mass data and a data service without an interruption phenomenon through an IP. Further, the network 300 may be formed by joining one or more networks among a wired network, a wireless broadband (WiBro) network, a $3^{rd}$ mobile communication network including a WCDMA, a $3.5^{th}$ mobile communication network including a high speed downlink packet access (HSDPA) network and an LTE network, a $4^{th}$ mobile communication network including LTE advanced, a satellite communication network, and a WiFi network.

Further, as the terminal apparatus 200, any communication apparatuses which are usable by the user may be used. For example, the terminal apparatus 200 may include a personal computer (PC), a notebook computer, a mobile phone, a tablet PC, a navigation terminal, a smart phone, personal digital assistants (PDA), a portable multimedia player (PMP), and a digital broadcast receiver. Of course, this is just an example and the terminal apparatus 200 should be analyzed as a concept including all communicatable apparatuses which have been developed and commercialized at present and will be developed in future in addition to the aforementioned example.

Figure 2:
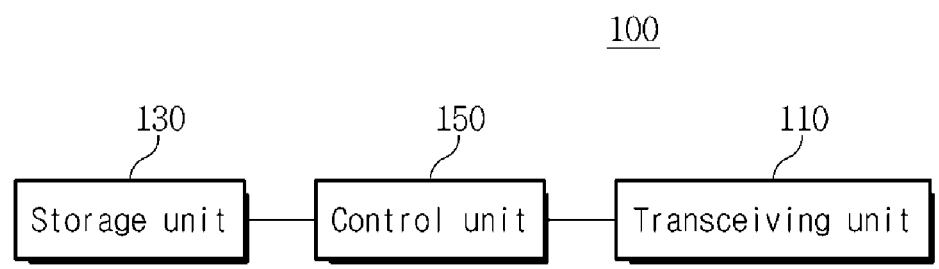
FIG. 2 is a configuration diagram in which a configuration of a service apparatus in accordance with an embodiment of the present invention is divided by the unit of a function.

FIG. 2 is a configuration diagram in which a configuration of a service apparatus 100 in accordance with an embodiment of the present invention is divided by the unit of a function. Referring to FIGS. 1 and 2, the service apparatus 100 is configured to include a transceiving unit 110, a storage unit 130, and a control unit 150.

The transceiving unit 110 has an interface for transmitting and receiving data to and from the terminal apparatus 200 through the network 300.

The storage unit 130 may store the map data for each version.

FIG. 5 is a diagram illustrating a structure of the map data in accordance with an embodiment of the present invention. In detail, referring to FIG. 5, the map data is divided into N levels. Herein, the level corresponds to a zoom level and as the level is higher, the map may be expressed in more detail, and as a result, a data amount to be expressed increases. Further, the map data of each level is constituted by a plurality of tile data divided by the unit of a predetermined size. The number of tiles is divided into M, M', M'', and the like differently for each level. Herein, since each tile data is divided based on a location, each tile data represents different areas. Further, the tile data is constituted by L layers. The layers represent data such as the sea, a river, a land boundary, a contour, a road, a building, a subway, and the like, respectively and as such, represent a map completed by duplication of layer data showing different attributes.

Further, the storage unit 130 may store identification information of the terminal apparatus 200 for authenticating a service use right for the user of the terminal apparatus 200 or store authentication information such as an ID and a password of the user. However, herein, the information for authenticating a use right of the user is not limited thereto.

The storage unit 130 may include all types of storage media such as a network access storage (NAS) as well as a read access memory (RAM), a read only memory (ROM), a hard disk drive (HDD), a flash memory, a CDROM, and a DVD.

The control unit 150 serves to totally control operations of the transceiving unit 110 and the storage unit 130.

The control unit 150 manages a version of the map data stored in the storage unit 130, and compares a latest version of the map data and the version of the map data stored in the terminal apparatus 200 to check a changed part. In more detail, the control unit 150 creates the map data update information for notifying the changed part. In this case, the map data update information may be expressed by the combinations of the level ID, the tile ID, and the layer ID, as described above. The map data update information may be transmitted to the terminal apparatus 200 by at least one of the level unit, the tile unit, and the layer unit of the map data.

In this case, the control unit 150 may receive version information of the map data incorporated in the terminal apparatus 200 and major movement path information from the terminal apparatus 200. Further, the control unit 150 checks the version information of the map data of the terminal apparatus 200 and when the map data needs to be updated, the control unit 150 extracts a target to be updated from the map data matched with the received major movement path of the user of the terminal apparatus 200 to create the map data update information.

Subsequently, the control unit 150 partially transmits the map data according to the request for the partial map data of the terminal apparatus 200. In detail, the control unit 150 extracts the data of the level unit, the layer unit, or the tile unit requested by the terminal apparatus 200 from the latest version of map data stored in the storage unit 110 and transmits the extracted data to the terminal apparatus 200.

Further, the control unit 150 may provide route information according to a request by the terminal apparatus 200. In detail, the control unit 150 receives a current location and destination information of the terminal apparatus from the terminal apparatus 200 based on the map data and when the control unit 150 receives the request for the route information, the control unit 150 calculates a route for moving from a starting point to a destination to provide the calculated route to the terminal apparatus 200. In this case, the control unit 150 may provide the route from the current location to the destination by receiving the current location information of the terminal apparatus 200 and further, may calculate a plurality of routes or calculate an optimal route and provide the plurality of routes or optimal route which is calculated. However, of course, a function to provide the route may be performed by the terminal apparatus 200.

Meanwhile, the control unit 150 may authenticate the service use right of the user for the terminal apparatus 200 by using the authentication information stored in the storage unit 130 and provide the service to only the terminal apparatus 200 of the user which is authenticated to have the use right.

Figure 3:
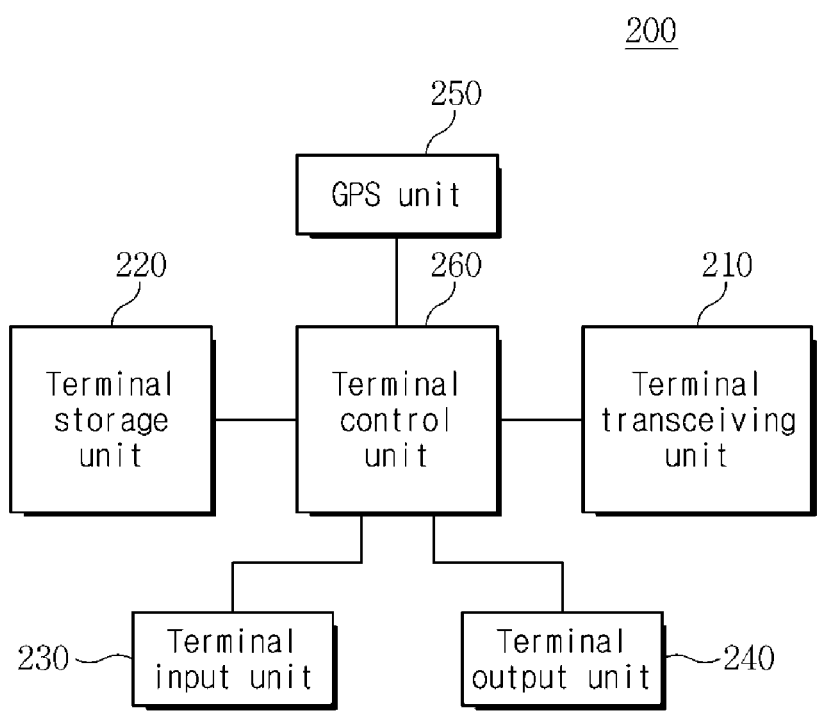
FIG. 3 is a configuration diagram in which a configuration of a terminal apparatus in accordance with an embodiment of the present invention is divided by the unit of a function.

FIG. 3 is a configuration diagram in which a configuration of a terminal apparatus 200 in accordance with an embodiment of the present invention is divided by the unit of a function. Referring to FIGS. 1 and 3, the terminal apparatus 200 is configured to include a terminal transceiving unit 210, a terminal storage unit 220, a terminal input unit 230, a terminal output unit 240, a global positioning system (GPS) unit 250, and a terminal control unit 260.

The terminal transceiving unit 210 has an interface for transmitting and receiving data to and from the service apparatus 100 through the network 300.

The terminal storage unit 220 as means of storing data and a program required for operating the terminal 200 basically stores an operation program and an application program to be executed by the terminal control unit 260. In particular, in the present invention, the terminal storage unit 220 is a storage for storing the map data.

The terminal input unit 230 generates a user input signal according to an operation by the user. The terminal input unit 230 may be implemented by various types of input means. For example, the terminal input unit 230 may include one or more means of a key input means, a touch input means, a gesture input means, and a voice input means. The key input means which generates a signal corresponding to a relevant key according to an operation of a key includes a keypad and a keyboard. The touch input means recognizes an input operation by sensing an operation of touching a specific part by the user may include a touch pad, a touch screen, and a touch sensor. The gesture input means recognizes user's operations, for example, designated specific operations such as an operation of swinging or moving the terminal apparatus 200, an operation to access the terminal apparatus 200, an operation of blinking his/her eyes, and the like as specific input signals and may include one or more sensors of a geomagnetic sensor, an acceleration sensor, a camera, an altimeter, a gyro sensor, and a proximity sensor. Particularly, in the embodiment, the user may input user's schedule information through the terminal input unit 230 and input information on the starting point or the destination for the route guidance service.

The terminal output unit 240 is a part that output s an operation state and an operation result of the terminal apparatus 200 to the user according to a control by the terminal control unit 260 and particularly, the terminal output unit 240 in the present invention may display the map data and output the map data to guide the route to the user. The terminal output unit 240 may be implemented by display means and may be, for example, any one of a liquid crystal display (LCD), a thin film transistor liquid crystal display (TFTLCD), a light emitting diode (LED), an organic light emitting diode (OLED), an active matrix organic light emitting diode (AMOLED), a flexible display, and a 3D display.

The GPS unit 250 calculates a location, movement or not, or a movement speed of the user of the user terminal apparatus 200 from a GPS signal and transmits to the terminal control unit 260 information on the calculated location and speed of the terminal apparatus 200.

The terminal control unit 260 serves to totally control operations of the terminal transceiving unit 210, the terminal storage unit 220, the terminal input unit 230, the terminal output unit 240, and the GPS unit 250.

The terminal control unit 260 receives and stores the information such as the location, movement or not, or movement speed of the user calculated by the GPS unit 250, and extracts the user's major movement path information to check the user's major movement path through the extracted major movement path information. In order to check the major movement path, the terminal control unit 260 tracks the location of the user calculated by the GPS unit 250 during a predetermined period to extract the user's major movement path information. Further, the terminal control unit 260 receives the user's schedule information to extract the user's major movement path information from a user's schedule. Herein, the user's schedule includes the user's movement path during a predetermined period in future.

The terminal control unit 260 receives from the service apparatus 100 the map data update information changed according to the user's major movement path information and the version information. The terminal control unit 260 extracts partial map data which needs to be updated in the map data matched with the user's major movement path information by receiving the map data update information for notifying the change to request the update information for the extracted partial map data to the server apparatus 100.

In this case, the terminal control unit 260 may request the map data by the level unit, the tile unit, or the layer unit. In detail, the terminal control unit 260 may request only the tile unit of the map data corresponding to the major movement path of the user of the terminal apparatus 200. Further, the terminal control unit 260 checks setting information of the terminal apparatus 200 such as zoom setting in which the map data is displayed in the terminal output unit 240 to request only the level unit required for the setting information and checks the movement state information of the terminal apparatus 200 such as the movement speed and the movement or not of the user of the terminal apparatus 200 to request only the layer unit required to update the map data. For example, when the movement speed of the user is high, layer data representing an attribute close to the location of the user may be preferentially requested or when the user is moving after searching for a specific place, layer data representing an attribute associated with the searched specific place may be preferentially requested.

In another embodiment of the present invention, the terminal control unit 260 may transmit the major movement path information of the user of the terminal apparatus 200 and the version information of the data stored in the terminal apparatus 200, to the service apparatus 100 by checking the major movement path of the user of the terminal apparatus 200. In this case, as described above, the service apparatus 100 checks the major movement path information of the user of the terminal apparatus 200 to transmit only the map data update information matched with the verified user's major movement path information.

Further, when the terminal control unit 260 receives the map data update information, the terminal control unit 260 may extract required partial map data, that is, partial map data to be updated by using at least one information of the setting information of the terminal apparatus 200 and the movement state of the terminal apparatus 200 as described above.

Subsequently, when the terminal control unit 260 requests for updating the partial map data to the service apparatus 100 and receives the update information on the requested partial map data from the service apparatus 100, the terminal control unit 260 partially updates the map data by updating the stored map data by using the received update information on the partial map data.

Figure 4:
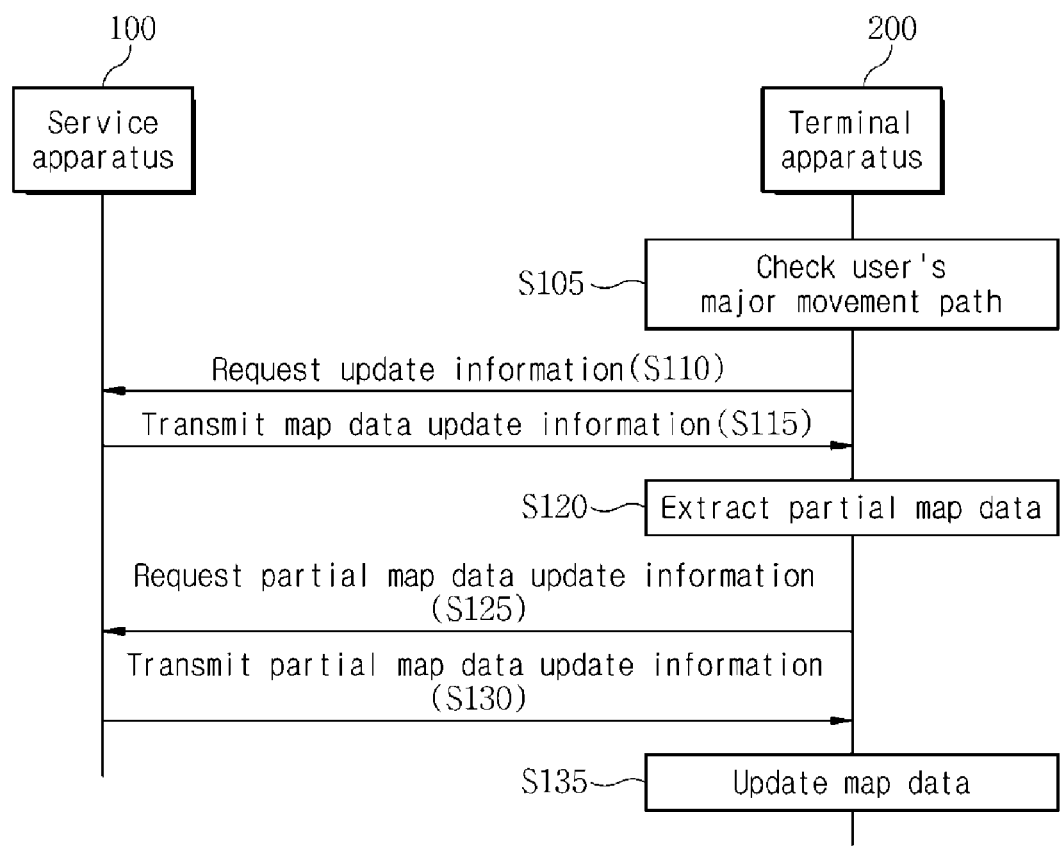
FIG. 4 is a flowchart illustrating a method for partially updating map data in accordance with an embodiment of the present invention.

FIG. 4 is a flowchart illustrating a method for partially updating map data in accordance with an embodiment of the present invention. Referring to FIGS. 1 and 4, the terminal apparatus 200 checks a major movement path of a user of the terminal apparatus 200 (S105).

In this case, the terminal apparatus 200 tracks a location of the user during a predetermined period by using a GPS signal to check the user's major movement path. Further, the terminal apparatus 200 receives user's schedule information to check the user's major movement path from a user's schedule.

The terminal apparatus 200 requests map data update information to the service apparatus 100 (S110).

In this case, the terminal apparatus 200 may transmit information on the major movement path of the user of the terminal apparatus 200 and version information of data stored in the terminal apparatus 200, and may request the map data update information.

Further, the service apparatus 100 manages map data for each version and when the map data is updated, the service apparatus 100 transmits an update notification message that the map data has been updated to the terminal apparatus 200. As a result, the terminal apparatus 200 may request the map data update information to the service apparatus 100. The service apparatus 100 may use a broadcasting scheme or a push message in order to transmit the update notification message, but a scheme to transmit a message is not limited thereto.

Meanwhile, step S105 and step S110 may be performed in parallel and step S105 is first described for easy description, but step S110 may be first performed, of course.

The service apparatus 100 that receives the request for the map data update information in step S110 compares a version of the stored map data and checks a changed part to transmit the map data update information notifying the changed part to the terminal apparatus 200 (S115).

In this case, the service apparatus 100 may transmit to the terminal apparatus 200 the map data update information by at least one unit of a level unit, a tile unit, a layer unit of the map data.

Further, when the service apparatus 100 receives the user's major movement path information and the version information of the data stored in the terminal apparatus 200 from the terminal apparatus 200 in step S110, the service apparatus 100 checks the version information of the map data of the terminal apparatus 200, and extracts a target to be updated from map data matched with the major movement path of the user of the terminal apparatus 200 to create the map data update information.

The terminal apparatus 200 that receives the map data update information in step S115 extracts partial map data matched with the major movement path of the user of the terminal apparatus 200, which needs to be updated (S120) and requests update information for the extracted partial map data to the service apparatus 100 (S125).

In this case, the terminal apparatus 200 may extract the partial map data which needs to be updated by additionally using at least one information of setting information of the terminal apparatus 200 such as zoom setting in which the map data is displayed in an terminal output unit 240, a movement state of the terminal apparatus 200 such as a movement speed of the terminal apparatus 200.

Of course, when the terminal apparatus 200 receives the map data update information matched with the major movement path of the user of the terminal apparatus 200 from the service apparatus 100 in step S115, the terminal apparatus 200 extracts the partial map data which needs to be updated by further using at least one information of the setting information of the terminal apparatus 200 or the movement state of the terminal apparatus 200.

Further, the terminal apparatus 200 may request the map data by the level unit, the tile unit, and the layer unit.

The service apparatus 100 that receives the request for the partial map data in step S125 extracts a latest version of the map data and transmits to the terminal apparatus 200 the update information for the partial map data requested in the extracted latest version of map data (S130).

The terminal apparatus 200 that receives the information on the partial map data in step S130 partially updates the partial map data by partially updating the map data by using information on partial map data received from the incorporated map data (S135).

While this invention has been particularly shown and described with reference to an exemplary embodiment thereof, the present invention is not limited to a configuration and an operation illustrated and described, but it will be understood by those skilled in the art that various changes in form and details may be made therein without departing from the spirit and scope of the invention as defined by the appended claims. Therefore, it will be considered that such all appropriate changes and modifications, and equivalents belong to the scope of the present invention.

Industrial Applicability

According to the present invention, additional cost is minimized because an additional apparatus is not required as compared with an existing system for providing traffic information. In particular, considering a trend of an increase in the number of users who move by using a vehicle, a method for partially updating map data of the present invention will be frequently utilized.

The invention claimed is:

1. A system for partially updating map data based on a user's movement path, the system comprising:
   a service apparatus configured to
      transmit map data update information to a terminal apparatus, when receiving a request for update information for partial map data from the terminal apparatus,
      extract the requested update information for the partial map data, and
      transmit the extracted update information for the partial map data to the terminal apparatus; and
   the terminal apparatus configured to
      extract major movement path information of a user of the terminal apparatus to check a major movement path of the user through the extracted major movement path information,
      receive the map data update information from the service apparatus,
      extract partial map data to be updated from map data matched with the major movement path of the user, by using at least one information of (i) setting information of the terminal apparatus and (ii) movement state information of the terminal apparatus,
      send a request for update information for the extracted partial map data to the service apparatus,
      receive the requested update information for the partial map data matched with the major movement path of the user from the service apparatus, and
      partially update the map data by using the received update information for the partial map data.

2. A service apparatus, comprising:
   a transceiving unit configured to transmit and receive data;
   a storage unit configured to store map data; and
   a control unit configured to
      transmit map data update information to a terminal apparatus through the transceiving unit,
      when receiving a request for update information for partial map data from the terminal apparatus,
         extract the requested update information on the partial map data to be updated from the map data, by using at least one information of (i) setting information of the terminal apparatus and (ii) movement state information of the terminal apparatus, and transmit the extracted update information for the partial map data to the terminal apparatus through the transceiving unit.

3. The service apparatus of claim 2, wherein the control unit is further configured to transmit the map data update information as at least one unit of a level unit, a tile unit, and a layer unit of the map data.

4. The service apparatus of claim 2, wherein the control unit is further configured to receive major movement path information of a user of the terminal apparatus and version information of map data of the terminal apparatus from the terminal apparatus, check the version information of the map data of the terminal apparatus and when updating is required, transmit the map data update information for map data matched with the major movement path of the user.

5. The service apparatus of claim 2, wherein the storage unit is further configured to store authentication information of the user, and wherein the control unit is further configured to authenticate the terminal apparatus by using the user's authentication information, and transmit the map data update information to the terminal apparatus which is authenticated.

6. The service apparatus of claim 2, wherein, when the control unit receives information on a starting point and a destination of the user, the control unit is configured to calculate a route from the starting point to the destination, and transmit information on the calculated route to the terminal apparatus.

7. A terminal apparatus, comprising:

a terminal transceiving unit configured to transmit and receive data;

a terminal storage unit configured to store map data;

a terminal input unit configured to input information;

a terminal output unit configured to output information;

a global positioning system (GPS) unit configured to calculate a location and a speed of the terminal apparatus from a GPS signal; and a terminal control unit configured to extract major movement path information of a user of the terminal apparatus to check a major movement path of the user through the extracted major movement path information, receive map data update information from a service apparatus through the terminal transceiving unit, extract partial map data to be updated from map data matched with the major movement path of the user, by using at least one information of (i) setting information of the terminal apparatus and (ii) movement state information of the terminal apparatus, sending a request for update information for the extracted partial map data to the service apparatus through the terminal transceiving unit, receive the requested update information for the partial map data matched with the major movement path of the user from the service apparatus through the terminal transceiving unit, and partially update the map data stored in the terminal storage unit by using the received update information for the partial map data.

8. The terminal apparatus of claim 7, wherein the terminal control unit is further configured to request the update information for the partial map data as at least one unit of a level unit, a tile unit, and a layer unit of the map data.

9. The terminal apparatus of claim 7, wherein the terminal control unit is further configured to detect a location of the terminal apparatus in real time during a predetermined period to check the major movement path of the user through a change of the detected location.

10. The terminal apparatus of claim 7, wherein the terminal control unit is further configured to check the major movement path of the user through schedule information received through the terminal input unit.

11. A method for partially updating map data based on a user's movement path, the method comprising:

extracting, by a terminal apparatus, major movement path information of a user of the terminal apparatus, and checking a major movement path of the user through the extracted major movement path information;

receiving, by the terminal apparatus, map data update information from a service apparatus;

extracting, by the terminal apparatus, partial map data to be updated from map data matched with the major movement path of the user, by using at least one information of (i) setting information of the terminal apparatus and (ii) movement state information of the terminal apparatus;

sending, by the terminal apparatus, a request for update information for the extracted partial map data to the service apparatus;

receiving, by the terminal apparatus, the requested update information for the partial map data matched with the major movement path of the user from the service apparatus; and partially updating, by the terminal apparatus, the map data by using the received update information for the partial map data.

12. The method of claim 11, further comprising:

before the receiving of the map data update information, requesting, by the terminal apparatus, the map data update information from the service apparatus.

13. A computer-readable recording medium recording thereon a program for causing a terminal apparatus to perform:

extracting major movement path information of a user of the terminal apparatus, and checking a major movement path of the user through the extracted major movement path information;

receiving map data update information from a service apparatus;

extracting partial map data to be updated from map data matched with the major movement path of the user, by using at least one information of (i) setting information of the terminal apparatus and (ii) movement state information of the terminal apparatus;

sending a request for update information for the extracted partial map data to the service apparatus;

receiving the requested update information for the partial map data from the service apparatus; and partially updating prestored map data by using the received update information for the partial map data.

14. The system of claim 1, wherein the setting information comprises zoom setting information of the terminal apparatus, and the movement state information comprises movement speed information of the terminal apparatus.

15. The service apparatus of claim 2, wherein the setting information comprises zoom setting information of the terminal apparatus, and the movement state information comprises movement speed information of the terminal apparatus.

16. The terminal apparatus of claim 7, wherein the setting information comprises zoom setting information of the terminal apparatus, and the movement state information comprises movement speed information of the terminal apparatus.

17. The method of claim 11, wherein the setting information comprises zoom setting information of the terminal apparatus, and the movement state information comprises movement speed information of the terminal apparatus.

18. The computer-readable recording medium of claim 13, wherein the setting information comprises zoom setting information of the terminal apparatus, and the movement state information comprises movement speed information of the terminal apparatus.

\* \* \* \* \*